US011627390B2

(12) United States Patent
Tsai et al.

(10) Patent No.: US 11,627,390 B2
(45) Date of Patent: Apr. 11, 2023

(54) ENCODING METHOD, PLAYING METHOD AND APPARATUS FOR IMAGE STABILIZATION OF PANORAMIC VIDEO, AND METHOD FOR EVALUATING IMAGE STABILIZATION ALGORITHM

(71) Applicant: VIA Technologies, Inc., Taipei (TW)

(72) Inventors: Tsung-Yu Tsai, Taipei (TW); I-Chih Chen, Taipei (TW)

(73) Assignee: VIA TECHNOLOGIES, INC., Taipei (TW)

( * ) Notice: Subject to any disclaimer, the term of this patent is extended or adjusted under 35 U.S.C. 154(b) by 550 days.

(21) Appl. No.: 16/435,721

(22) Filed: Jun. 10, 2019

(65) Prior Publication Data
US 2020/0244888 A1 Jul. 30, 2020

(30) Foreign Application Priority Data
Jan. 29, 2019 (TW) ................. 108103347

(51) Int. Cl.
*G06K 9/40* (2006.01)
*H04N 23/68* (2023.01)
(Continued)

(52) U.S. Cl.
CPC ....... *H04N 23/6845* (2023.01); *G06T 3/0087* (2013.01); *G06T 7/20* (2013.01);
(Continued)

(58) Field of Classification Search
CPC ....... G06T 3/00; G06T 3/0006; G06T 3/0018; G06T 3/0031; G06T 3/005; G06T 3/0062;
(Continued)

(56) References Cited

U.S. PATENT DOCUMENTS 10,165,186 B1 * 12/2018 Brailovskiy ....... H04N 5/23238
10,404,915 B1 * 9/2019 Chen ................... H04N 5/23258
(Continued)

FOREIGN PATENT DOCUMENTS

CN  101231456 A   7/2008
CN  106257911 A   12/2016
(Continued)

*Primary Examiner* — Eric Rush
(74) *Attorney, Agent, or Firm* — McClure, Qualey & Rodack, LLP

(57) ABSTRACT

An encoding method, playing method and apparatus for image stabilization of panoramic video, and a method for evaluating image stabilization algorithm are provided. The image stabilization method for the panoramic video is applicable to an electronic apparatus including a processor. In the method, a plurality of image frames of a panoramic video is captured, and each image frame is transformed into a plurality of projection frames on a plurality of faces of a cubemap. Then, variations of triaxial displacements and attitude angles between the projection frames transformed onto each of the faces and adjacent in time are calculated. The variations of triaxial displacements and attitude angles are smoothed and recorded as movement information. While playing the panoramic video, the panoramic video is corrected by the movement information and played. Thus, it is possible to reduce the amount of calculation required for the stabilization calculations on the captured video.

13 Claims, 5 Drawing Sheets

(51) Int. Cl.
*G06T 3/00* (2006.01)
*H04N 19/513* (2014.01)
*H04N 19/573* (2014.01)
*G06T 7/20* (2017.01)
*H04N 19/51* (2014.01)

(52) U.S. Cl.
CPC .......... *H04N 19/51* (2014.11); *H04N 19/521* (2014.11); *H04N 19/573* (2014.11); *H04N 23/685* (2023.01); *H04N 23/6842* (2023.01)

(58) Field of Classification Search
CPC ... G06T 3/0068; G06T 3/0087; G06T 3/0093; G06T 3/20; G06T 3/4038; G06T 3/60; G06T 5/006; G06T 7/20; G06T 7/246; G06T 7/30; G06T 7/33; G06T 7/37; G06T 7/38; G06T 7/80; G06T 7/97; G06T 2207/10016; G06K 9/00201; G06K 9/00744; G06K 9/00758; G06K 9/209; G06K 9/36; G06K 9/44; G06K 9/46; H04N 5/23238; H04N 5/23248; H04N 5/23251; H04N 5/23254; H04N 5/23258; H04N 5/23264; H04N 5/23267; H04N 5/23274; H04N 5/23277; H04N 5/2328; H04N 5/2625; H04N 5/2628; H04N 9/3147; H04N 9/3185; H04N 9/3191; H04N 13/10; H04N 13/106; H04N 13/161; H04N 13/172; H04N 13/178; H04N 13/282; H04N 19/50; H04N 19/503; H04N 19/51; H04N 19/513; H04N 19/517; H04N 19/52; H04N 19/521; H04N 19/573; H04N 19/597; H04N 23/6811; H04N 23/6812; H04N 23/683; H04N 23/6842; H04N 23/6845; H04N 23/685; H04N 23/698; G03B 37/00; G03B 37/04

USPC ....... 382/100, 107, 154, 174, 190, 195, 199, 382/232, 236, 248, 254, 275, 276, 284, 382/285, 293–296, 302, 307, 312, 325; 348/36, 38, 39, 208.99, 208.2, 208.4, 348/208.5, 208.6, 208.13, 222.1, 239, 348/241, 333.02, 410.1, 412.1, 413.1, 348/414.1, 415.1, 416.1, 417.1, 418.1, 348/441, 474, 578, 580, 583, 584, 607, 348/608, 699, 714, 715, 716; 352/38, 39, 352/47, 53, 69, 70; 396/52–55, 311, 333, 396/334, 421, 435, 436

See application file for complete search history.

(56) References Cited

U.S. PATENT DOCUMENTS

| | | | |
|---|---|---|---|
| 10,812,718 | B2 * | 10/2020 | Cai .................. G06T 7/277 |
| 2015/0029306 | A1 * | 1/2015 | Cho .................. G06T 7/246 348/38 |
| 2017/0142337 | A1 * | 5/2017 | Kokaram .......... H04N 5/23238 |
| 2017/0366808 | A1 | 12/2017 | Lin et al. |
| 2018/0359415 | A1 * | 12/2018 | Liang ................ G06T 7/246 |
| 2019/0281319 | A1 * | 9/2019 | Galpin .............. G06T 7/248 |
| 2019/0349598 | A1 * | 11/2019 | Aminlou ............ H04N 19/105 |
| 2020/0213609 | A1 * | 7/2020 | Galpin .............. H04N 19/513 |
| 2020/0260071 | A1 * | 8/2020 | Hannuksela ........ H04N 19/39 |
| 2021/0006718 | A1 * | 1/2021 | Chen ................. H04N 5/23238 |
| 2021/0120250 | A1 * | 4/2021 | Zhao ................. H04N 19/172 |

FOREIGN PATENT DOCUMENTS

| | | |
|---|---|---|
| CN | 106507094 A | 3/2017 |
| CN | 108648141 A | 10/2018 |
| CN | 109040575 A | 12/2018 |
| CN | 109246422 A | 1/2019 |

* cited by examiner

ENCODING METHOD, PLAYING METHOD AND APPARATUS FOR IMAGE STABILIZATION OF PANORAMIC VIDEO, AND METHOD FOR EVALUATING IMAGE STABILIZATION ALGORITHM

CROSS-REFERENCE TO RELATED APPLICATION

This application claims the priority benefit of Taiwan application serial no. 108103347, filed on Jan. 29, 2019. The entirety of the above-mentioned patent application is hereby incorporated by reference herein and made a part of this specification.

TECHNICAL FIELD

The present disclosure relates to a method and apparatus for data processing, in particular, to an image stabilization method and apparatus for panoramic video as well as a method for evaluating an image stabilization algorithm.

BACKGROUND

Compared with videos captured with a conventional camera, videos from a panoramic camera enable the viewers to immerse themselves. However, when the viewer is watching a panoramic video using a Virtual Reality (VR) or other apparatus, any shake of images from the shooting may be magnified, thereby exacerbating the dizziness and discomfort to the viewer.

For most of the commercially available panoramic cameras, stabilization calculations are applied on the captured videos so that the whole images are replaced and overwritten and a new video will be stored separately. However, such a calculation requires a relatively long calculation time and additional storage space.

SUMMARY

In light of the foregoing, the present disclosure provides an image stabilization method and apparatus for a panoramic video, which is capable of correcting a panoramic video having a shake during shooting to a panoramic video of stable images. The present disclosure further provides a method for evaluating an image stabilization algorithm applicable for evaluating performances of an image stabilization method.

An image stabilization encoding method for a panoramic video according to an embodiment of the present disclosure is applicable to an electronic apparatus including a processor. This method comprises capturing a plurality of image frames of a panoramic video and transforming each image frame into a plurality of projection frames on a plurality of faces of a cubemap. Then variations of triaxial displacements and attitude angles between the projection frames, transformed onto each of the faces, of image frames adjacent in time are calculated. Finally, the results of the variations of triaxial displacements and attitude angles are stored as movement information used for correcting the panoramic video when it is played.

An image stabilization playing method for a panoramic video according to an embodiment of the present disclosure is applicable to an electronic apparatus including a processor. This method comprises reading a plurality of image frames of a panoramic video and splicing the image frames onto a spherical mesh. Then, movement information corresponding to the panoramic video is read so as to correct the image frames spliced to the spherical mesh using the variations of attitude angles in the movement information. Finally, the corrected images of the spherical mesh are buffered in a memory and displaced according to the variations of triaxial displacements in the movement information for playing, wherein the variations of triaxial displacements and the variations of attitude angles in the movement information are generated from the calculations of the variations of the triaxial displacements and attitude angles between the cubemap projection frames for the image frames adjacent in time of the panoramic video.

An image stabilization apparatus for panoramic video according to an embodiment of the present disclosure comprises a connection device, a storing device, and a processor. The connection device is coupled to an image source device to acquire a panoramic video from the image source device. The storing device stores a program. The processor couples the connection device and the storing device, loads and executes the program in the storing device to acquire a plurality of image frames of the panoramic video, and transforms each image frame into a plurality of projection frames on a plurality of faces of a cubemap. Then variations of triaxial displacements and attitude angles between the projection frames, transformed onto each of the faces, of image frames adjacent in time are calculated. Finally, the results of the variations of triaxial displacements and attitude angles are stored as movement information, wherein the movement information is used for correcting the panoramic video when the panoramic video is played.

A method for evaluating an image stabilization algorithm according to an embodiment of the present disclosure is applicable to an electronic apparatus including an image capturing device and a processor. The method comprises moving the image capturing device according to multiple preset variations of triaxial displacements and attitude angles to shoot at least one test patter, so as to obtain a plurality of image frames of a panoramic video. Then the image stabilization algorithm is applied to the image frames for a correction, to obtain corrected image frames. Finally, multiple correcting amounts of triaxial displacements and attitude angles used in the correction are compared with the preset variations of triaxial displacements and attitude angles, to calculate an indicator for evaluating performances of the image stabilization algorithm.

According to the present disclosure, while the panoramic video is played, the image stabilization apparatus may use the movement information to correct the panoramic video, so as to reduce the shake in the panoramic video. By substituting the movement information, which has a small amount of data, with the stabilized panoramic video, it is possible to reduce the amount of calculation required for the stabilization calculations on the captured video, which allows a stabilization of images without requiring additional storing space.

To make the foregoing features and advantages of the present disclosure more obvious and understandable, embodiments are given below and are described with reference to the drawings.

DETAILED DESCRIPTION

According to the present disclosure, image frames of a panoramic video are projected onto a plurality of faces of a cube, so that the variations of triaxial displacements and attitude angles between the projection frames for each image frame are calculated and recorded as movement information. While the panoramic video is played, the image stabilization apparatus may use such movement information for correcting the panoramic video, so as to reduce the shake in the panoramic video. By substituting the stabilized panoramic video with the movement information which has a small amount of data, it is possible to reduce the amount of calculation required for the stabilization calculations on the captured video, which allows a stabilization of images without requiring additional storing space.

Figure 1:
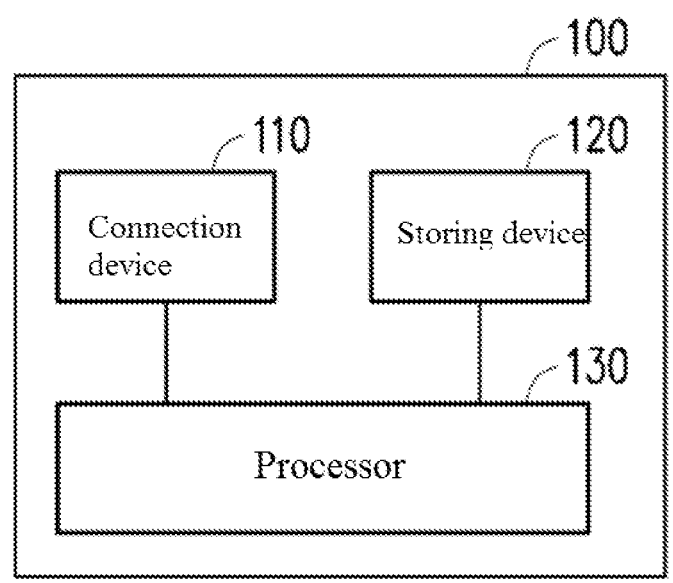
FIG. 1 shows a block diagram of the image stabilization apparatus according to an embodiment of the present disclosure.

FIG. 1 illustrates a block diagram of the image stabilization apparatus according to an embodiment of the present disclosure. An example of the image stabilization apparatus of the present embodiment is the electronic apparatus 100 shown in FIG. 1. The electronic apparatus 100 comprises at least the connection device 110, the storing device 120, and the processor 130. The electronic apparatus 100 may be, for example, a camera, a video camera, a cellphone, a personal computer, a VR device, a cloud server, or other apparatus with computing functions, and the present disclosure is not limited hereto.

The connection device 110 is coupled to an image source device (not shown) to receive from the image source device a panoramic video. Specifically, the connection device 110 may be any transmission interface, such as universal serial bus (USB), RS232, Bluetooth (BT), and wireless fidelity (Wi-Fi), connected to the image source device via a wired or wireless connection and receiving the panoramic video captured by the image source device, the present disclosure is not limited hereto. The image source device may be, for example, a panoramic camera capable of capturing a panoramic video, a hard drive or a memory card storing a panoramic video, or a server located remotely for storing a panoramic video, the present disclosure is not limited hereto.

The storing device 120 may be, for example, a fixed or mobile random access memory (RAM), a read-only memory (ROM), a flash memory, a hard drive or a similar element of any type, or a combination thereof, for storing a program executable by the processor 130.

The processor 130 couples to the connection device 110 and the storing device 120 and is capable of loading and executing the program stored in the storing device 120. In different embodiments, the processor 130 may be, for example, a central processing unit (CPU), or another general or dedicated programmable microprocessor, a digital signal processor (DSP), a programmable controller, an application specific integrated circuits (ASIC), a programmable logic device (PLD) and the likes, or a combination thereof, the present disclosure is not limited hereto.

Figure 2:
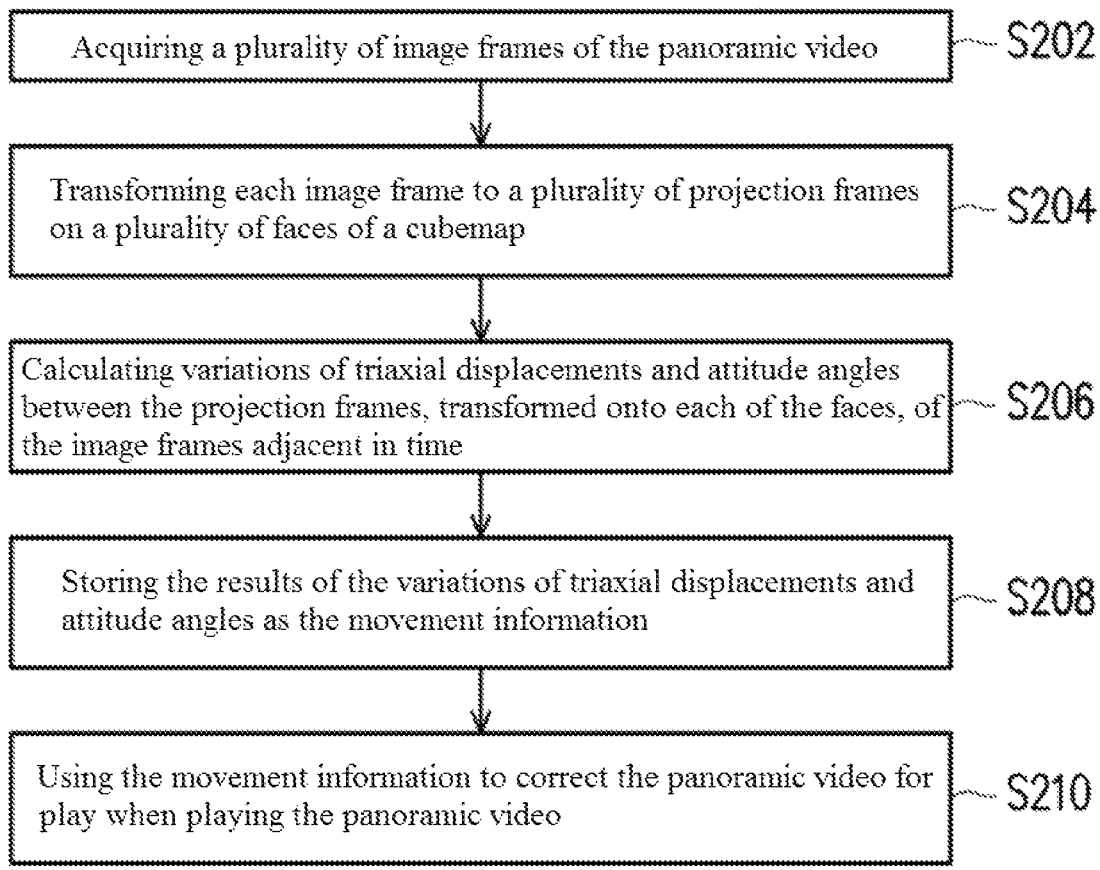
FIG. 2 shows a flow chart of the image stabilization method for panoramic video according to an embodiment of the present disclosure.

FIG. 2 shows a flow chart of the image stabilization method for panoramic video according to an embodiment of the present disclosure, where steps S202 to S208 relate to the image encoding method for the image stabilization of a panoramic video. The step S210 relates to the image playing method for the image stabilization of a panoramic video. Referring to FIG. 1 and FIG. 2, the methods of the present embodiment are applicable to the above-described electronic apparatus 100. Detailed steps of the image stabilization method for panoramic video according to the present embodiment are described in conjunction with the individual devices and components of the electronic apparatus 100. One skilled in the art should understand that the encoding method for the image stabilization of a panoramic video is not necessarily performed in the same electronic apparatus 100 as the playing method for the image stabilization. Instead, the encoding method for the image stabilization may be performed in an electronic apparatus 100 while the playing method for the image stabilization may be performed in a different electronic apparatus 100a (not shown) having a similar computing function.

Firstly, the processor 130 acquires a plurality of image frames of a panoramic video (Step 202). The panoramic video may be received by the connection device 110 in the electronic apparatus 100 from the image source device. In this embodiment, the image source device may be a panoramic camera configured with two sets of 180-degree fisheye lenses for video shooting with back-to-back directions, or a panoramic camera configured with more sets of fisheye lenses for video shooting with directions of different angles. The panoramic camera splices image frames from videos of multiple directions into a panoramic image frame of, for example, a two-dimensional format, to complete the panoramic video. The image source device may also be an apparatus for storing the panoramic video such as a hard driver, a memory card, or a remote server; the present disclosure is not limited hereto.

In addition, in an embodiment, each image frame of the panoramic video is shown in the format of equirectangular projection. The equirectangular projection maps longitudes to vertical lines of constant spacing and maps latitudes to horizontal lines of constant spacing. In other embodiments, in addition to the equirectangular projection, the Miller cylindrical projection, the Cassini projection, the cubemap, the equi-angular cubemap (EAC), etc., may be used to present each image frame of the panoramic video.

After a plurality of image frames have been acquired, the processor 130 transforms each image frame to a plurality of projection frames on a plurality of faces of a cubemap (step S204). In an embodiment, the plurality of faces of the cubemap may include one of each pair of opposite faces in the three pairs of opposite faces. The processor 130, for example, may use the cubemap to project each image frame of the panoramic video onto one of the opposing front and back faces, one of the opposing left and right faces, and one of the opposing top and bottom faces of a cube in a three-dimensional space.

Figure 3A:
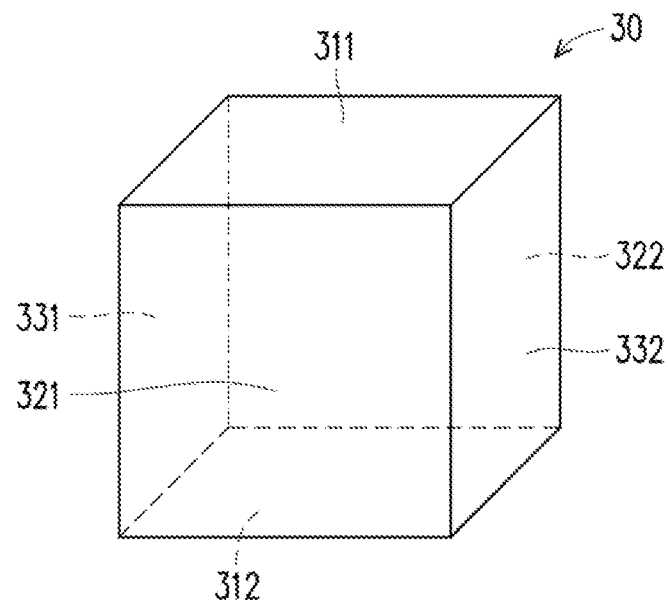
FIGS. 3A and 3B show a schematic diagram of projection of a cubemap according to an embodiment of the present disclosure.
Figure 3B:
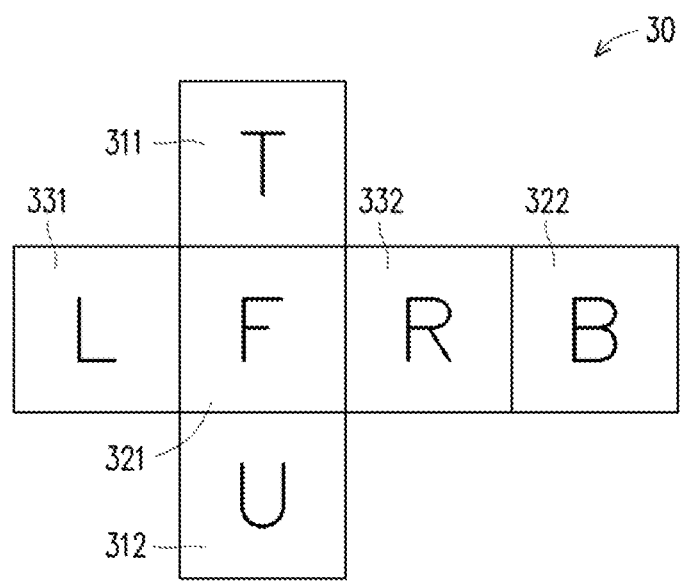

For instance, FIGS. 3A and 3B show a schematic diagram of projection of a cubemap according to an embodiment of the present disclosure. Referring to FIGS. 3A and 3B, FIG. 3B is an unfolded view of the cube 30. In this embodiment, each image frame of the panoramic video is subjected to a mapping projection with the six faces of the cube 30 being the map shape. That is, each image frame of the panoramic video may be projected to the six faces of the cube 30, including the left face 331, the right face 332, the front face 321, the back face 322, the top face 311, and the bottom face 312, generating the left projection frame L, the right projection frame R, the front projection frame F, the back projection frame B, the top projection frame T, and the bottom projection frame U, respectively. The method for the conversion of various projection methods to the cubemap projection is well known to one skilled in the art and will not be detailed herein. In an embodiment, the cubemap may merely involve one face for each pair of opposite faces in the three pairs of opposite faces of the cube 30, for the calculations in the subsequent steps. For example, the image frame may only be mapped to the front face 321, the right face 332, and the bottom face 312 to obtain the projection frames F, R and U.

Then, the processor 130 calculates variations of triaxial displacements (i.e., displacements in the directions of X-axis, Y-axis, and Z-axis, respectively) and attitude angles between the projection frames, transformed onto each of the faces, of the image frames adjacent in time (step S206). The attitude angles include roll angle, yaw angle, and pitch angle. It should be noted that when the variations of triaxial displacements and attitude angles are calculated from the six faces of the cubemap, the projection frames adjacent in time projected onto one of the left and right faces of the cube may be used to the calculate the values of the displacements and the attitude angles in the corresponding axial direction, for example, the displacements along the X-axis and the Z-axis, and the pitch angle; the projection frames adjacent in time projected onto one of the front and back faces of the cube may be used to calculate the values of the displacements and the attitude angles in the corresponding axial directions, for example, the displacements along the Y-axis and the Z-axis, and the roll angle; and the projection frames adjacent in time projected onto one of the top and bottom faces of the cube may be used to calculate the values of the displacements and the attitude angles in the corresponding axial directions, for example, the displacements along the X-axis and the Y-axis, and the yaw angle. Therefore, it is possible that only the projection frames mapped to the front face, the right face, and the bottom face of the cube be used in calculating the variations of triaxial displacements and attitude angles, so as to reduce the amount of calculation. In a further embodiment, all six faces of the cubemap may be used for calculating the variations of triaxial displacements and attitude angles, and the values calculated from each pair of opposite faces are averaged. For example, each of the projection onto the left face and the projection onto the right face of the cube is used to calculate a respective set of values of the displacements along the X-axis and the Z-axis and the pitch angle; the two sets of values are averaged as the final values of the displacements along the X-axis and the Z-axis, and pitch angle; the same calculations are performed for the corresponding front and back faces and the corresponding top and bottom faces.

In this embodiment, when calculating the variations of triaxial displacements and attitude angles, the processor 130, for example, may detect a plurality of feature points in each of the projection frames and calculate the differences between corresponding feature points in the projection frames for the image frames adjacent in time, so as to estimate the variations of triaxial displacements and attitude angles. For instance, in order to obtain the differences between the corresponding feature points in the projection frames, feature point detections may be performed (for example, by edge detection, corner detection, or other feature point detection methods) on the plurality of projection frames transformed from image frames of the panoramic video, to find the plurality of feature points in each projection frame. The number of feature points detected in a projection frame may be set by a user or preset by a system. The more feature points are used, the more accurate the subsequent calculations of the variations of triaxial displacements and attitude angles will be, while the more calculation time or calculation resource will be required. In an embodiment, the processor 130 may use a function of goodFeatruesToTrack( ) provided in OpenCV to obtain the coordinates of the pixels of the feature points, and then the displacements between the feature points in the projection frames for the image frames adjacent in time will be calculated, so as to estimate the variations of triaxial displacements and attitude angles. In another embodiment, it is also possible to apply depth estimation technology on the plurality of projection frames transformed from each image frame of the panoramic video, for example, use relative blurriness, block-based matching, or optical flow method, to calculate an amount of displacement of each pixel in each projection frame, so that from the amount of displacement of each pixel, the variations of triaxial displacements and attitude angles between the projection frames adjacent in time may be estimated. The method for calculating the variations of triaxial displacements and attitude angles is not limited to this embodiment.

Then, the processor 130 stores the results of the variations of triaxial displacements and attitude angles as the movement information (step S208). In an embodiment, the variations of triaxial displacements and attitude angles may be smoothed first; then the smoothed results may be stored as the movement information. The calculation method for smoothing the variations of triaxial displacements and attitude angles may be a simple average in terms of time, or optionally, calculations of Gaussian-smooth are applied on the variations of triaxial displacements and the variations of attitude angles respectively in terms of time to calculate the smoothed variations of triaxial displacements and the smoothed variations of attitude angles. For example, the variations of triaxial displacements and attitude angles between several projection frames adjacent in time are averaged or Gaussian-smoothed. The calculation method of smoothing is not limited to this embodiment. In an embodiment, the calculation method of smoothing may be adjusted according to the types of shaking (e.g., shaking caused by walking, running, or unsteady hands by the photographer during the shooting of the images), for example, by adjusting the number of projection frames adjacent in time for the average or the calculation of Gaussian-smooth, or by adjusting parameters used in the calculation of Gaussian-smoothing. In another embodiment, the range of values of the smoothed variations of triaxial displacements and/or that of the smoothed variations of attitude angles may be adjusted by multiplying a proper ratio constant. In a further embodiment, the smoothing step may not be performed and the results of the variations of triaxial displacements and attitude angles obtained in the step S206 are directly recorded as the movement information. On the other hand, in an embodiment, the processor 130 directly embeds the calculated movement information into a plurality of fields in the metadata of the panoramic video, i.e., integrates the calculated movement information with the original panoramic video file into one file. Specifically, the processor 130 may, for example, add new fields for such as time stamp, triaxial displacements, attitude angles, etc., to the metadata of the panoramic video. Take MP4 format as an example, the processor 130 may define new tags in the metadata and record movement data after a corresponding tag. In another embodiment, the processor 130 may store the calculated movement information as an additional movement information file, e.g., storing the movement data additionally as a file capable of transferring table data between programs, like a comma-separated values (.CSV) file. It should be noted that no matter whether the movement information is integrated with the original file or stored as an additional file, the original file content of the panoramic video will be stored and saved. In another embodiment, the metadata of the panoramic video or the stored additional movement information file may further contain fields for gyroscope information detected during the shooting of the panoramic video, such as the fields for longitude and latitude, triaxial rotation speed, triaxial linear accelerations, triaxial accelerations, etc.

Finally, while playing the panoramic video, the processor 130 uses the movement information to correct the panoramic video for playing (step S210). Specifically, while playing the panoramic video, the processor, for example, uses the video as images spliced to a spherical mesh, i.e., splices the image frames of the panoramic video to the spherical mesh, and then reads the recorded movement information, so as to use the variations of attitude angles (i.e., the roll angle, the yaw angle, and the pitch angle) to reversely correct the image frames spliced to the spherical mesh, thereby reducing the shake in the triaxial rotation directions. The processor 130, for example, may buffer the corrected images of the spherical mesh in a memory (e.g., a buffer of the display), and reversely displace the images of the spherical mesh according to the variations of triaxial displacements (i.e., moving reversely in directions of the X-axis, the Y-axis, and the Z-axis) before having it played on the display, thereby reducing the shake in the triaxial displacement directions.

In an embodiment of the present disclosure, the electronic apparatus 100 acquires the panoramic video V1 from the image source device, including image frames F0 to F3 with the time stamps T0 to T3. The electronic apparatus 100 has the image frames F0 to F3 projected onto, for example, the plurality of faces of the cube 30 shown in FIG. 3A to obtain the projection frames. The projection onto the left face 331 results in the projection frames F0_331 to F3_331; the projection onto the right face 332 results in the projection frames F0_332 to F3_332; the projection onto the back face 322 results in the projection frames F0_322 to F3_322; the projection onto the front face 321 results in the projection frames F0_321 to F3_321; the projection onto the top face 311 results in the projection frames F0_311 to F3_311; and the projection onto the bottom face 312 results in the projection frames F0_312 to F3_312.

As described in the foregoing, the processor 130 may just use the feature points in the projection frames on 3 faces of the cube 30, to calculate the variations of triaxial displacements and attitude angles between the projection frames with the time stamps T0 to T3. In this embodiment, the processor 130 calculates the variations of the displacements along the Y-axis and the Z-axis and the roll angles between the individual projection frames at adjacent time points with the time stamps T0 to T3 based on the projection frames F0_322 to F3_322 transformed onto the back face 322 from the image frames F0 to F3; calculates the variations of the displacements along the X-axis and the pitch angles between the individual projection frames at adjacent time points with the time stamps T0 to T3 based on the projection frames F0_332 to F3_332 transformed onto the right face 332; and calculates the variations of the yaw angles between the individual projection frames at adjacent time points with the time stamps T0 to T3 based on the projection frames F0_312 to F3_312 transformed onto the bottom face 312. However, the present disclosure is not limited hereto and may use the projection frames on different faces to calculate the corresponding variations of triaxial displacements and attitude angles. Then the processor 130 performs smoothing on the values of the variations and embeds the smoothed results into the corresponding fields in the metadata of the panoramic video. In an embodiment, the results of triaxial displacements and attitude angles recorded in the corresponding fields may be the accumulated variations with respect to an image frame of a particular time stamp (e.g. the first image frame in the panoramic video), wherein the calculated results of smoothing recorded in the fields are shown in Table 1 below (in the units of degrees).

TABLE 1

| Time stamp | X-axial displacement | Y-axial displacement | Z-axial displacement | pitch angle | roll angle | yaw angle |
|---|---|---|---|---|---|---|
| T0 | 87.36901 | 36.027657 | −24.343977 | 36.027657 | 87.369 | 87.87248 |
| T1 | 87.89885 | 32.960445 | −22.605251 | 32.96045 | 87.8988 | 88.237144 |
| T2 | 87.58022 | 33.8715 | −23.4202 | 33.871494 | 87.58018 | 87.991036 |
| T3 | 87.39248 | 45.426464 | −37.113262 | 45.426464 | 87.38351 | 88.16401 |

In another embodiment, the results of triaxial displacements and attitude angles recorded in the corresponding fields may also be variations with respect to the image frame of the previous time stamp. In other embodiments, the processor 130 may also store the smoothed results of Table 1 as an additional movement information file; the present disclosure is not limited hereto.

When the electronic apparatus 100 plays the panoramic video, the processor 130 uses the movement information to correct the panoramic video for playing. Specifically, the processor 130 first reads the image frames of the panoramic video and splices the image frames to the spherical mesh. Then, the processor 130 reads the previously recorded movement information and performs necessary unit and/or coordinate conversions (e.g., converting the units of the variations of triaxial displacements from degrees to pixel numbers) and apply the variations of the smoothed roll angles, yaw angles, and pitch angles recorded in the movement information to the spherical mesh. In other words, the variations of roll angles, yaw angles, and pitch angles are used for reverse corrections on the image frames spliced to the spherical mesh (i.e., rotating the image frames reversely by the variations of roll angles, yaw angles, and pitch angles). The processor 130 then buffers the corrected images of the spherical mesh in the storing device 120 or other memories (e.g., a buffer of the display) and displaces the corrected images of the spherical mesh reversely according to the variations of X-axial displacements, Y-axial displacements, and Z-axial displacements before having it played on a display.

In another embodiment of the present disclosure, as described in the foregoing, the processor 130 further acquires gyroscope information detected during the shooting of the panoramic video and has it recorded together with the smoothed results as the movement information. In this way, while playing the panoramic video, in addition to correcting the panoramic video with the smoothed results, the processor 130 may use the gyroscope information for post-production effects on the corrected panoramic video for playing. For example, since the gyroscope information may be used to identify the real-world top and bottom positions with respect to the ground during the shooting of the panoramic video, post-production effects such as bullet time and automatic image leveling may be realized with the gyroscope information.

Figure 4:
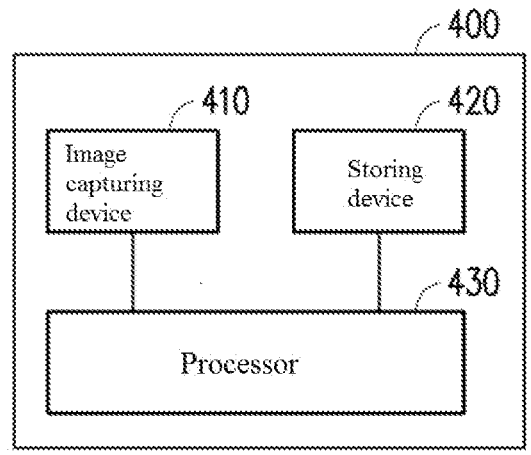
FIG. 4 shows a block diagram of the apparatus for evaluating the image stabilization algorithm according to an embodiment of the present disclosure.

Another embodiment of the present disclosure further provides a method for evaluating image stabilization algorithms; the method is applicable to an electronic apparatus including an image capturing device and a processor. FIG. 4 shows a block diagram of an apparatus for evaluating the image stabilization algorithm according to an embodiment of the present disclosure. An example of the apparatus for evaluating in this embodiment is the electronic apparatus 400 shown in FIG. 4. The electronic apparatus 400 comprises at least the image capturing device 410, the storing device 420, and the processor 430. The electronic apparatus 400 may be for example a camera, a video camera, a cellphone, a personal computer, a VR device, a cloud server, or other apparatus having a computing function. For example, the image capturing device 410 may be an image sensor equipped with a charge coupled device (CCD), a complementary metal-oxide semiconductor (CMOS) device, or a photosensitive device of other types, and is capable of sensing the intensity of light entering the optical lens to generate an image. The types of the storing device 420 and the processor 430 may be the same with or similar to that of the storing device 120 and the processor 130 of the afore-described embodiments, respectively, and thus are not further detailed herein.

Figure 5:
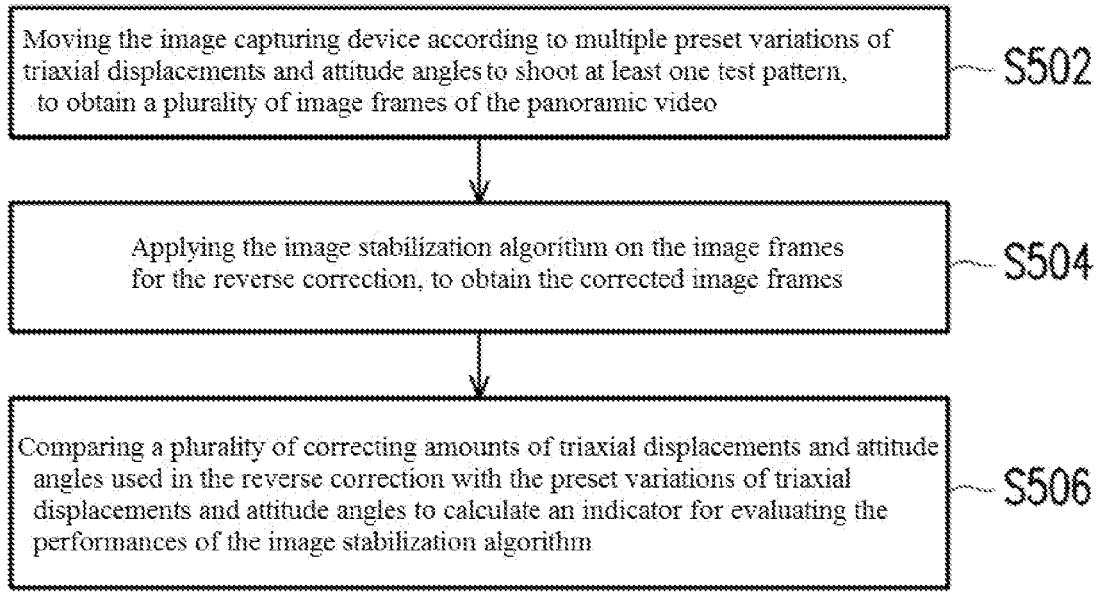
FIG. 5 shows a flow chart of the method for evaluating the image stabilization algorithm according to an embodiment of the present disclosure.

FIG. 5 shows a flow chart of the method for evaluating the image stabilization algorithm according to an embodiment of the present disclosure. Referring to FIGS. 4 and 5, the method according to this embodiment is applicable to the above-described electronic apparatus 400. Detailed steps of the method for evaluating the image stabilization algorithm according to the present embodiment are described in conjunction with the individual devices and components of the electronic apparatus 400.

Firstly, the processor 430 of the electronic apparatus 400 moves the image capturing device 410 according to multiple preset variations of triaxial displacements and attitude angles to shoot at least one test pattern (for example, but not limited to, one test pattern in each of the triaxial directions), to obtain a plurality of image frames of the panoramic video (step S502). Then, the image stabilization algorithm to be evaluated is applied on the image frames for the reverse correction, to obtain the corrected image frames (step S504). Finally, a plurality of correcting amounts of triaxial displacements and attitude angles used in the reverse correction are compared with the preset variations of triaxial displacements and attitude angles, to calculate an indicator for evaluating the performances of the image stabilization algorithm (step S506). The method for evaluating the image stabilization algorithm may further comprise comparing the plurality of correcting amounts of triaxial displacements and attitude angles used in the reverse correction with data recorded by a peripheral hardware device, to calculate a time difference in the synchronization between a video encoder executed by the processor 430 of the electronic apparatus 400 and the peripheral hardware device.

Figure 6A:
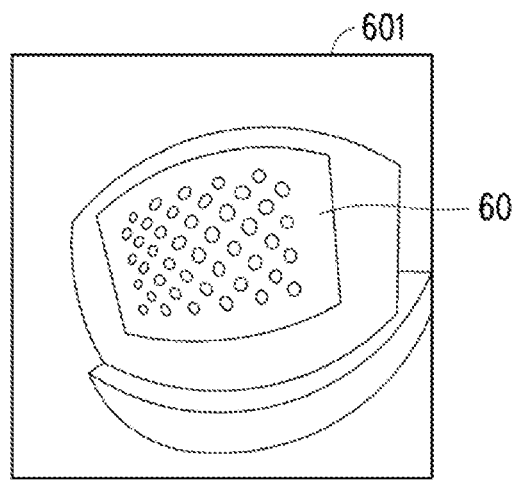
FIGS. 6A and 6B show an example of the method for evaluating the image stabilization algorithm according to an embodiment of the present disclosure.
Figure 6B:
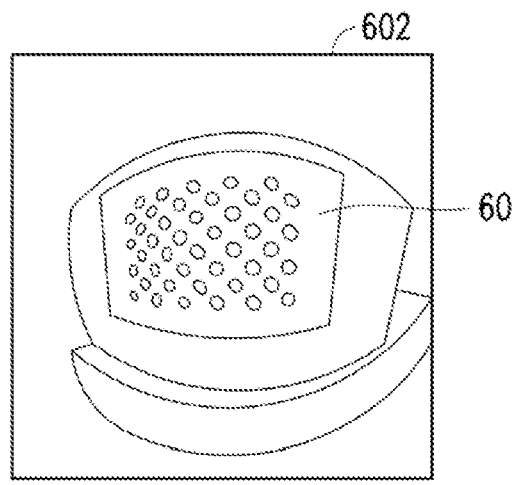

For instance, FIGS. 6A and 6B show an example of the method for evaluating the image stabilization algorithm according to an embodiment of the present disclosure. Referring to FIGS. 4, 6A, and 6B, the embodiment is applicable to the electronic apparatus 400 shown in FIG. 4. The processor 430 of the electronic apparatus 400 may first use the image capturing device 410 to capture an image frame 601 (as shown in FIG. 6A) containing a test pattern 60 (only one is shown), and then move or rotate the image capturing device 410 according to multiple preset variations of triaxial displacements and attitude angles to shoot the test pattern 60 to obtain the image frame 602 shown in FIG. 6B. The multiple preset variations of triaxial displacements and attitude angles include the variations of displacements in the directions of the X-axis, the Y-axis, and the Z-axis, and the variations of roll angles, yaw angles, and pitch angles rotated with respect to the X-axis, the Y-axis, and the Z-axis.

Since the movement of the image capturing device 410 is made according to the preset variations, the processor 430 may, after executing the image stabilization algorithm to be evaluated for the image frames captured by the image capturing device 410 to perform the reverse correction, compare an actual distance or rotation angle (i.e., variations of triaxial displacements and attitude angles) by which it moved the image capturing device 410 with the plurality of correction amounts of triaxial displacements and attitude angles used for the reverse correction by executing the image stabilization algorithm for the frames, so as to evaluate whether the correction is correct and/or to evaluate the accuracy of the correction result.

Specifically, in the execution of a reverse correction on the image frames by the image stabilization algorithm, for example, "correcting amounts of triaxial displacements and attitude angles used for the reverse correction" may be obtained. Accordingly, the evaluation according to this embodiment, for example, is to calculate a difference between the "variations of triaxial displacements and attitude angles" in the actual movement of the image capturing device 410 and the "correcting amounts of triaxial displacements and attitude angles used for the reverse correction" obtained in executing the image stabilization algorithm in the measure of pixels, and the amount of the difference is used as an indicator for evaluating the performances of the image stabilization algorithm.

In an embodiment, the method for evaluating image stabilization algorithm may, in addition to evaluate the correctness of the correction, further compare time-based variations of results by the video encoder of the electronic apparatus 400 executing the image stabilization algorithm with time-based variations of data recorded by the peripheral hardware device, to assist the calculation of the time difference in synchronization between the video encoder of the electronic apparatus 400 and the peripheral hardware device, which may be used in the calculation of synchronization between various software and hardware. The peripheral hardware device may be hardware for measuring the positions and directions of displacement and rotation of the electronic apparatus, such as a gyroscope or an inertial measurement unit; the present disclosure is not limited hereto.

As described in the foregoing, the image stabilization method and apparatus for panoramic video and the method for evaluating image stabilization algorithm according to the present disclosure projects image frames of the panoramic video onto a plurality of faces of a cube, calculates the variations of triaxial displacements and attitude angles between individual projection frames and has them recorded as movement information. Thus, the panoramic video may be corrected using the movement information when being played. In this way, calculation amount required for stabilization calculation on captured videos may be reduced according to the present disclosure, and also realizes stabilization of images without additional storing space.

Although preferred embodiments of the present disclosure have been described above, it will be appreciated that the present disclosure is not limited to the disclosed embodiments. A number of variations and modifications may occur to those skilled in the art without departing from the scopes and spirits of the described embodiments. Therefore, it is intended that the scope of protection of the present disclosure is defined by the appended claims.

The invention claimed is:

1. An image stabilization encoding method for a panoramic video, applicable to an electronic apparatus including a processor, the method comprising the steps of:
   acquiring a plurality of image frames of the panoramic video;
   transforming each image frame of the plurality of image frames into a plurality of projection frames on a plurality of faces of a cubemap;
   calculating variations of triaxial displacements and attitude angles between the projection frames, transformed onto each of the faces, of image frames adjacent in time; and
   storing results of the variations of triaxial displacements and attitude angles as movement information, wherein the results of the variations of triaxial displacements and attitude angles comprise average values of the variations of triaxial displacements and attitude angles calculated from each pair of opposite faces of the cubemap, respectively, and wherein the movement information is used for correcting the panoramic video when the panoramic video is played.

2. The image stabilization encoding method according to claim 1, wherein calculating the variations of triaxial displacements and attitude angles between the projection frames, transformed onto each of the faces, of the image frames adjacent in time includes:
   detecting a plurality of feature points in each projection frame of the plurality of projection frames; and
   calculating differences between corresponding feature points in the projection frames for the image frames adjacent in time, so as to estimate the variations of triaxial displacements and attitude angles.

3. The image stabilization encoding method according to claim 1, wherein storing results of the variations of triaxial displacements and attitude angles as the movement information includes:
   smoothing the variations of triaxial displacements and attitude angles, and storing results of the smoothed variations of triaxial displacements and attitude angles as the movement information.

4. The image stabilization encoding method according to claim 1, wherein storing results of the variations of triaxial displacements and attitude angles as the movement information includes:
   embedding the movement information into a plurality of fields in metadata of the panoramic video.

5. The image stabilization encoding method according to claim 1, further comprising:
   acquiring gyroscope information detected during a shooting of the panoramic video; and
   storing the gyroscope information and the results of the variations of triaxial displacements and attitude angles as the movement information, wherein the gyroscope information in the movement information is used for post-production effects for playing the corrected panoramic video.

6. An image stabilization playing method for panoramic video, applicable to an electronic apparatus including a processor, the method comprising the steps of:
   reading a plurality of image frames of the panoramic video and splicing the image frames onto a spherical mesh;
   reading movement information corresponding to the panoramic video to correct reversely the image frames spliced to the spherical mesh using results of variations of attitude angles in the movement information; and
   buffering the corrected image frames of the spherical mesh in a memory, and displacing the image frames of the spherical mesh according to results of variations of triaxial displacements in the movement information for playing, wherein the results of variations of triaxial displacements and the results of variations of attitude angles in the movement information are generated from calculations of the variations of triaxial displacements and attitude angles between cubemap projection frames for image frames adjacent in time of the panoramic video, and the results of the variations of triaxial displacements and attitude angles comprise average values of the variations of triaxial displacements and attitude angles calculated from each pair of opposite faces of a cubemap, respectively.

7. The image stabilization playing method according to claim 6, wherein the movement information is a plurality of fields embedded into metadata of the panoramic video.

8. The image stabilization playing method according to claim 6, wherein the movement information further includes gyroscope information, wherein the gyroscope information is used for post-production effects for playing a corrected panoramic video.

9. An image stabilization apparatus for a panoramic video, comprising:
   a connection device coupling to an image source device to acquire the panoramic video from the image source device;
   a storing device storing a program; and
   a processor coupling to the connection device and the storing device, which is configured to load and execute the program in the storing device to:
   acquire a plurality of image frames of the panoramic video;
   transform each image frame of the plurality of image frames into a plurality of projection frames on a plurality of faces of a cubemap;
   calculate variations of triaxial displacements and attitude angles between the projection frames, transformed onto each of the faces, of image frames adjacent in time, wherein results of the variations of triaxial displacements and attitude angles comprise average values of the variations of triaxial displacements and attitude angles calculated from each pair of opposite faces of the cubemap, respectively; and
   store the results of the variations of triaxial displacements and attitude angles as movement information, wherein the movement information is used for correcting the panoramic video when the panoramic video is played.

10. The image stabilization apparatus according to claim 9, wherein the processor is further configured to detect a plurality of feature points in each projection frame of the plurality of projection frames and calculate differences between corresponding feature points in the projection frames for the image frames adjacent in time, so as to estimate the variations of triaxial displacements and attitude angles.

11. The image stabilization apparatus according to claim 9, wherein the processor is further configured to smooth the variations of triaxial displacements and attitude angles, and store results of the smoothed variations of triaxial displacements and attitude angles as the movement information.

12. The image stabilization apparatus according to claim 9, wherein the processor is further configured to embed the movement information into a plurality of fields in metadata of the panoramic video.

13. The image stabilization apparatus according to claim 9, wherein the processor is further configured to acquire gyroscope information detected during a shooting of the panoramic video, and store the gyroscope information and the results of the variations of triaxial displacements and attitude angles as the movement information, wherein the gyroscope information in the movement information is used for post-production effects for playing the corrected panoramic video.

* * * * *